United States Patent
Kung (10) Patent No.: US 8,366,116 B2
(45) Date of Patent: Feb. 5, 2013

(54) SHAFT-SEALING DEVICE

(76) Inventor: Chi-Yun Kung, Kaohsiung (TW)

( * ) Notice: Subject to any disclaimer, the term of this patent is extended or adjusted under 35 U.S.C. 154(b) by 324 days.

(21) Appl. No.: 12/882,262

(22) Filed: Sep. 15, 2010

(65) Prior Publication Data

US 2012/0020785 A1    Jan. 26, 2012

(30) Foreign Application Priority Data

Jul. 23, 2010   (TW) .............................. 99124409 A (51) Int. Cl.
*F16J 15/43*    (2006.01)
*F16J 15/447*   (2006.01)

(52) U.S. Cl. ........................................ 277/410; 277/412

(58) Field of Classification Search .................. 277/410, 277/412
See application file for complete search history.

(56) References Cited

U.S. PATENT DOCUMENTS

| | | | |
|---|---|---|---|
| 5,047,392 A * | 9/1991 | Hed ................................ | 505/165 |
| 5,954,342 A * | 9/1999 | Mikhalev et al. ............. | 277/410 |
| 7,100,923 B2 * | 9/2006 | Anzai et al. .................... | 277/410 |
| 7,188,840 B2 * | 3/2007 | Li .................................. | 277/302 |
| 2003/0042684 A1 * | 3/2003 | Dawson et al. ............... | 277/412 |
| 2004/0012150 A1 * | 1/2004 | Anzai et al. .................... | 277/410 |

FOREIGN PATENT DOCUMENTS

JP    59 129 699      * 8/1984

* cited by examiner

*Primary Examiner* — Vishal Patel
*Assistant Examiner* — Nathan Cumar
(74) *Attorney, Agent, or Firm* — Alan Kamrath; Kamrath IP Lawfirm, P.A.

(57) ABSTRACT

A shaft-sealing device includes an outer ring for receiving a shaft sleeve to rotate therewith. A magnetic-field generating unit is mounted the around rotary shaft and includes inner and outer magnetic rings. The outer magnetic ring is mounted in the outer ring. A gap is defined between an inner periphery of the outer magnetic ring and an outer periphery of the inner magnetic ring and is filled with a magnetic liquid. One or both of the inner and outer magnetic rings provide magnetic force to retain the magnetic liquid in the gap. A seal ring is mounted between the outer magnetic ring and an end of the outer ring. A lip extends from an inner periphery of the seal ring toward or away from the end of the outer ring and is at a non-parallel angle to a radial direction of the seal ring to form a seal around the rotary shaft.

10 Claims, 11 Drawing Sheets

SHAFT-SEALING DEVICE

BACKGROUND OF THE INVENTION

The present invention relates to a shaft-sealing device and, more particularly, to a magnetic fluid shaft-sealing device with at least one seal ring to form at least one seal for a pump.

It is well known to mount a mechanical seal or a magnetic fluid seal in a pump for sealing between a pump housing of the pump and a rotary shaft in the pump housing. A typical magnetic fluid seal device generally includes a plurality of annular magnets mounted in an interior of the pump housing and around the rotary shaft or a shaft sleeve. Each magnet is sandwiched between two pole pieces also mounted around the rotary shaft. A magnetic liquid is filled in a sealing gap between an outer periphery of the rotary shaft and inner peripheries of the pole pieces. The rotary shaft and the poles pieces are made of magnetizable material. A closed magnetic circuit with magnetic force is created by flows of magnetic field lines from the magnets through the poles pieces, the rotary shaft, and the magnetic liquid and, thus, retains the magnetic liquid in the sealing gap to provide a sealing effect between the pump housing and the rotary shaft. The sealing effect of the magnetic fluid seal device mainly depends on the ability of keeping the magnetic liquid in the sealing gap. However, due to centrifugal force generated during rotation of the rotary shaft, the pumped medium or coolant in the pump tends to infiltrate into the sealing gap between the rotary shaft and the poles pieces, and the magnetic liquid in the sealing gap tends to leak outward. Further, assembly and maintenance of the typical magnetic fluid seal are inconvenient.

Thus, a need exists for a magnetic fluid seal device that can securely retain the magnetic liquid in the sealing gap while preventing the pumped medium or coolant in the pump from infiltrating into the sealing gap.

BRIEF SUMMARY OF THE INVENTION

The present invention solves this need and other problems in the field of magnetic fluid seal devices by providing, in a preferred form, a shaft-sealing device including a shaft sleeve adapted to receive a rotary shaft to rotate jointly therewith. An outer ring is mounted around the shaft sleeve and includes first and second ends spaced along an axis. A magnetic-field generating unit is mounted around the shaft sleeve and includes inner and outer magnetic rings spaced in a radial direction perpendicular to the axis. The inner magnetic ring includes inner and outer peripheries spaced in the radial direction. The inner periphery of the inner magnetic ring is mounted around and abuts the shaft sleeve. The outer magnetic ring is mounted in the outer ring and located between the outer ring and the inner magnetic ring in the radial direction. The outer magnetic ring includes an inner periphery facing the outer periphery of the inner magnetic ring. A gap is defined between the inner periphery of the outer magnetic ring and the outer periphery of the inner magnetic ring and is adapted to be filled with a magnetic liquid. One of the inner and outer magnetic rings is a magnet for creating a magnetic field providing magnetic force to retain the magnetic liquid in the gap. The shaft-sealing device further includes a first seal ring mounted in the outer ring and located between the outer magnetic ring and the first end of the outer ring. The first seal ring includes inner and outer peripheries spaced in the radial direction. The shaft sleeve extends through the first seal ring. The first seal ring further includes a first lip extending from the inner periphery of the first seal ring toward the first end of the outer ring and at a non-parallel angle to the radial direction of the first seal ring to form a first seal around the shaft sleeve.

Preferably, the outer ring further includes inner and outer peripheral surfaces spaced in the radial direction and a through-hole extending from the inner peripheral surface through the outer peripheral surface. The outer magnetic ring further includes a hole in communication with the through-hole. The magnetic liquid is adapted to be filled in the gap through the hole and the through-hole. The inner magnetic ring further includes two ends spaced along the axis and a first annular groove formed in the outer periphery of the inner magnetic ring and between the ends of the inner magnetic ring. The outer magnetic ring further includes two ends spaced along the axis and a second annular groove formed in the inner periphery of the outer magnetic ring and between the ends of the outer magnetic ring. The second annular groove of the outer magnetic ring is aligned with the first annular groove of the inner magnetic ring. The shaft-sealing device further includes a second seal ring mounted in the outer ring and located between the outer magnetic ring and the second end of the outer ring. The second seal ring includes inner and outer peripheries spaced in the radial direction. The shaft sleeve extends through the second seal ring. The second seal ring further includes a first lip extending from the inner periphery of the second seal ring toward the second end of the outer ring and at a non-parallel angle to the radial direction of the second seal ring to form a second seal around the shaft sleeve. Each of the first and second seal rings further includes a second lip extending from the inner periphery of each of the first and second seal rings inwards in the radial direction or in a direction reverse to an extending direction of the first lip.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "longitudinal", "inner", "outer", "end", "portion", "section", "radial", "centrifugal", "annular", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A shaft-sealing device of a first embodiment according to the preferred teachings of the present invention is shown in FIGS. 1 through 7 and generally designated 10. Shaft-sealing device 10 is mounted in a seal cover 11. Shaft-sealing device 10 and seal cover 11 are attached to a pump housing 12 and mounted around a rotary shaft 14 in pump housing 12 to provide a liquid seal between pump housing 12 and rotary shaft 14 (see FIG. 3). Seal cover 11 includes inner and outer end faces 20 and 22 spaced along an axis. Inner end face 20 is attached to an end 24 of pump housing 12. Seal cover 11 further includes a shaft hole 26 extending from inner end face 20 through outer end face 22 along the axis. Rotary shaft 14 extends through shaft hole 26. Shaft hole 26 includes an annular enlarged section 28 adjacent to outer end face 22 of seal cover 11 and having a diameter greater than that of a remaining portion of shaft hole 26. A plurality of openings 32 is formed in an outer periphery 30 of seal cover 11 and in communication with enlarged section 28. A plurality of engaging slots 34 is defined in outer end face 22 of seal cover 11.

Shaft-sealing device 10 is mounted in enlarged section 28 of shaft hole 26 of seal cover 11 and includes a shaft sleeve 36. Shaft sleeve 36 is made of magnetizable material and mounted around rotary shaft 14 to rotate therewith. Shaft sleeve 36 includes first and second sections 38 and 40 spaced along the axis. Shaft sleeve 36 further includes a longitudinal hole 42 extending from first section 38 through second section 40 and coaxial with the axis. Rotary shaft 14 extends through longitudinal hole 42 of shaft sleeve 36, and an O-ring 44 is mounted around rotary shaft 14 for sealing purposes. A portion of second section 40 of shaft sleeve 36 is received in enlarged section 28 of shaft hole 26 of seal cover 11, and a flange 45 is formed on an outer periphery of second section 40 of shaft sleeve 36. Flange 45 includes an inner end received in enlarged section 28 of shaft hole 26 and an outer end outside of shaft hole 26 of seal cover 11 and having a protruding annular engaging portion 46. A plurality of positioning holes 47 is defined in annular engaging portion 46 and spaced from one another in a circumferential direction. Engaging members 48 are extended through positioning holes 47 and abut against rotary shaft 14 to attach shaft sleeve 36 to rotary shaft 14. An annular groove 58 is formed in an outer periphery of flange 45 and aligned with engaging slots 34 of seal cover 11. A positioning plate 60 is received in each engaging slot 34 of seal cover 11 and engaged in annular groove 58 of flange 45. A screw 62 extends through a hole in each positioning plate 60 into seal cover 11 to prevent shaft sleeve 36 from moving relative to seal cover 11 along the axis.

Shaft-sealing device 10 further includes an outer ring 70 through which shaft sleeve 36 extend. Outer ring 70 includes first and second ends 76 and 78 spaced along the axis (see FIG. 6). A bend 77 is formed on each of first and second ends 76 and 78 and extends inwards in a radial direction perpendicular to the axis. Outer ring 70 further includes inner and outer peripheral surfaces 80 and 79 spaced in the radial direction. A plurality of through-holes 81 extends from inner peripheral surface 80 through outer peripheral surface 79.

Shaft-sealing device 10 further includes a magnetic-field generating unit 72 mounted in outer ring 70 and around second section 40 of shaft sleeve 36. Magnetic-field generating unit 72 includes inner and outer magnetic rings 84 and 86 spaced in the radial direction. At least one of inner and outer magnetic rings 84 and 86 is a magnet. In this embodiment, inner magnetic ring 84 is a pole piece made of magnetizable material and includes a central hole 88 receiving shaft sleeve 36. Inner magnetic ring 84 includes inner and outer peripheries 91 and 92 spaced in the radial direction. Inner periphery 91 of inner magnetic ring 84 is mounted around and abuts shaft sleeve 36. Inner magnetic ring 84 further includes two ends 90 spaced along the axis and a first annular groove 94 formed in outer periphery 92 and between ends 90 of inner magnetic ring 84. A positioning ring 96 is mounted around shaft sleeve 36. Two ends 90 of inner magnetic ring 84 respectively abut against flange 45 of shaft sleeve 36 and positioning ring 96 so that inner magnetic ring 84 is positioned between flange 45 and positioning ring 96. In this embodiment, a gasket 98 is mounted between one of two ends 90 of inner magnetic ring 84 and positioning ring 96. Another gasket 98 is mounted between the other end 90 of inner magnetic ring 84 and flange 45.

Outer magnetic ring 86 is mounted in outer ring 70 and located between outer ring 70 and inner magnetic ring 84 in the radial direction. Outer magnetic ring 86 includes two ends 100 spaced along the axis and inner and outer peripheries 104 and 102 spaced in the radial direction. Inner periphery 104 of outer magnetic ring 86 faces outer periphery 92 of inner magnetic ring 84, and a gap 108 is defined between inner periphery 104 of outer magnetic ring 86 and outer periphery 92 of inner magnetic ring 84 (see FIG. 7). Gap 108 is adapted to be filled with a magnetic liquid (not shown), and outer magnetic ring 86 is a magnet for creating a magnetic field providing magnetic force to retain the magnetic liquid in gap 108. In this embodiment, outer magnetic ring 86 further includes a second annular groove 106 in inner periphery 104 and between ends 100 of outer magnetic ring 86. Second annular groove 106 of outer magnetic ring 86 is aligned with first annular groove 94 of inner magnetic ring 84, and a plurality of holes 110 is provided in outer magnetic ring 86 and in communication with through-holes 81 in outer ring 70, so that the magnetic liquid can be filled in gap 108 via openings 32 in seal cover 11, through-holes 81 in outer ring 70, holes 110 in outer magnetic ring 86, and first and second annular grooves 94 and 106.

Shaft-sealing device 10 further includes first and second seal rings 74 and 75 mounted in outer ring 70. Each seal ring 74, 75 is made of rubber and intermediate one of bends 77 of outer ring 70 and outer magnetic ring 86 (see FIG. 7). Each seal ring 74, 75 includes inner and outer peripheries 114 and 112 spaced in the radial direction. Shaft sleeve 36 extends through each seal ring 74, 75. Each seal ring 74, 75 further includes an annular first lip 116 extending from inner periphery 114 thereof away from outer magnetic ring 86 and at a non-parallel angle to the radial direction. In this embodiment, first lip 116 of first seal ring 74 has arcuate cross sections and a distal end abutting against positioning ring 96, while first lip 116 of second seal ring 75 has arcuate cross sections and a distal end abutting against flange 45 of shaft sleeve 36. Furthermore, at least one gasket 118 is mounted between each seal ring 74, 75 and one of bends 77 of outer ring 70 such that first and second seal rings 74 and 75 can be tightly engaged in outer ring 70.

In use, a closed magnetic circuit with magnetic force is created by flows of magnetic field lines from outer magnetic ring 86 to retain the magnetic liquid in gap 108 between inner and outer magnetic rings 84 and 86, providing a sealing effect between pump housing 12 and rotary shaft 14. Furthermore, first lip 116 of first seal ring 74 extends toward first end 76 of outer ring 70 and abuts the outer periphery of positioning ring 96, and first lip 116 of second seal ring 75 extends toward second end 78 of outer ring 70 and abuts the outer periphery of flange 45 so that the pumped medium or coolant outside of magnetic-field generating unit 72 is not allowed to infiltrate into magnetic-field generating unit 72. Namely, the pumped medium or coolant flowing through shaft hole 26 of seal cover 11 can be stopped by first lips 116 of first and second seal rings 74 and 75 from infiltrating into outer ring 70. Further, shaft-sealing device 10 of the present invention can be assembled easily and conveniently. Specifically, with inner magnetic ring 84 mounted around shaft sleeve 36 and with outer magnetic ring 86 mounted in outer ring 70, shaft-sealing device 10 is allowed to be assembled easily and tightly.

In this embodiment, first section 38 of shaft sleeve 36 extends out of inner end face 20 of seal cover 11, and a mechanical seal 120 is mounted around first section 38 of shaft sleeve 36 to provide further sealing between pump housing 12 and rotary shaft 14. Mechanical seal 120 includes a housing 122, a stationary ring 124 mounted in housing 122, a rotary ring 126, and a plurality of springs 128. Stationary ring 124 is mounted around shaft sleeve 36 and positioned in seal cover 11. Rotary ring 126 is moveably mounted around shaft sleeve 36 and biased by springs 128 toward stationary ring 124 to provide sealing engagement therebetween.

Figure 1:
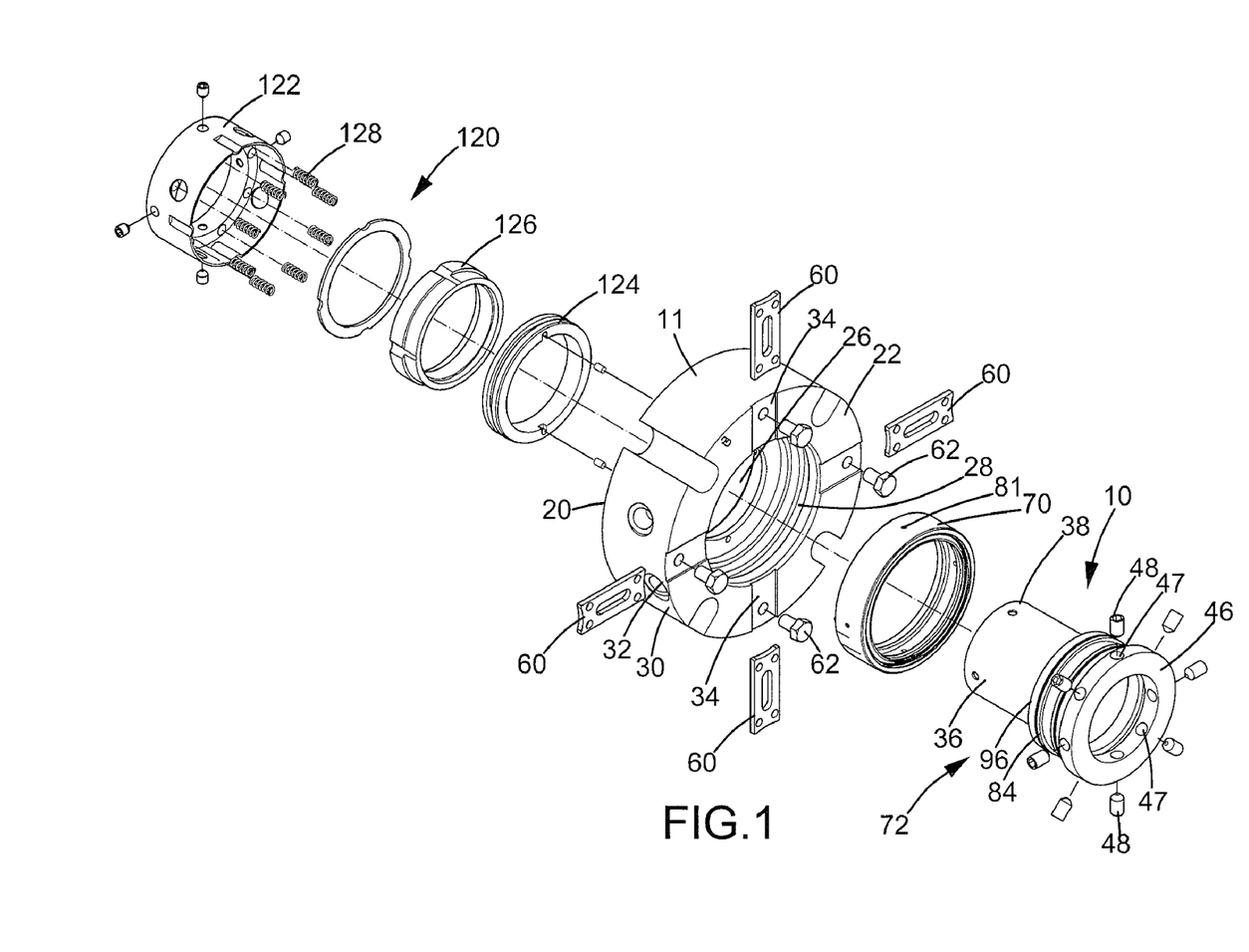
FIG. 1 shows an exploded, perspective view of a shaft-sealing device of a first embodiment according to the preferred teachings of the present invention and a seal cover.
Figure 2:
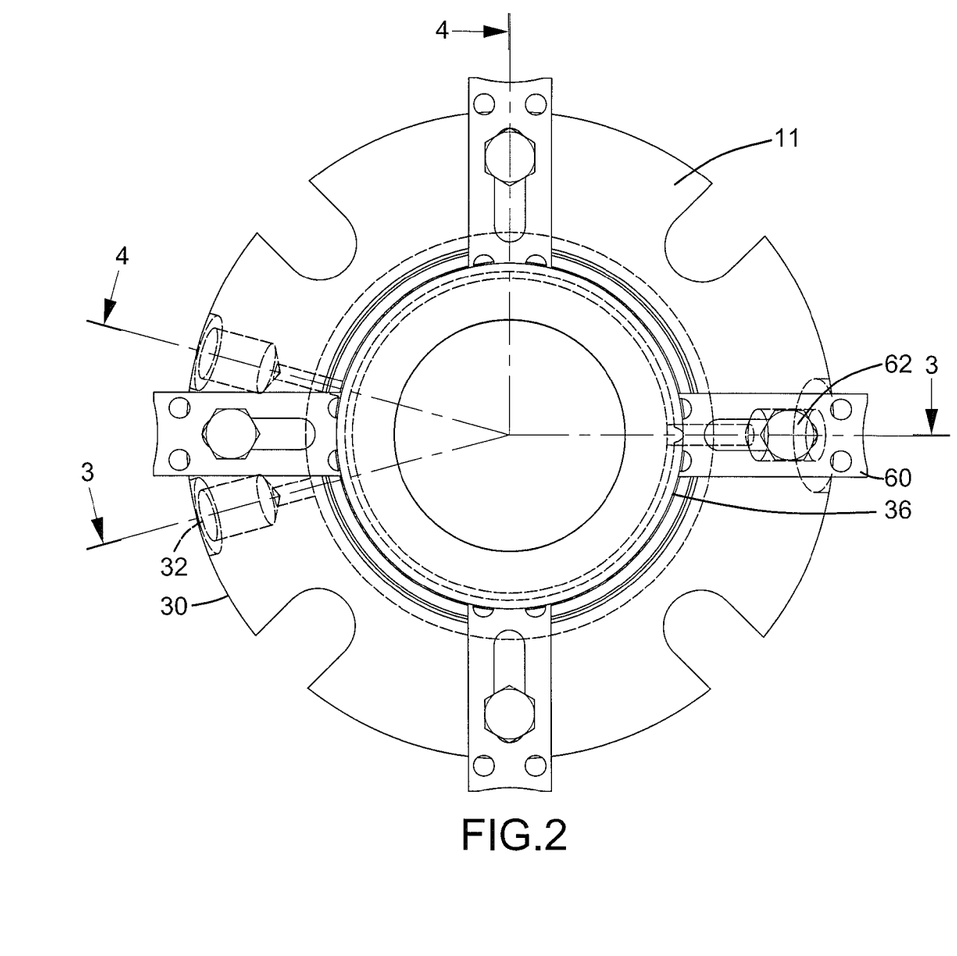
FIG. 2 shows a side view of the shaft-sealing device and the seal cover of FIG. 1 after assembly.
Figure 3:
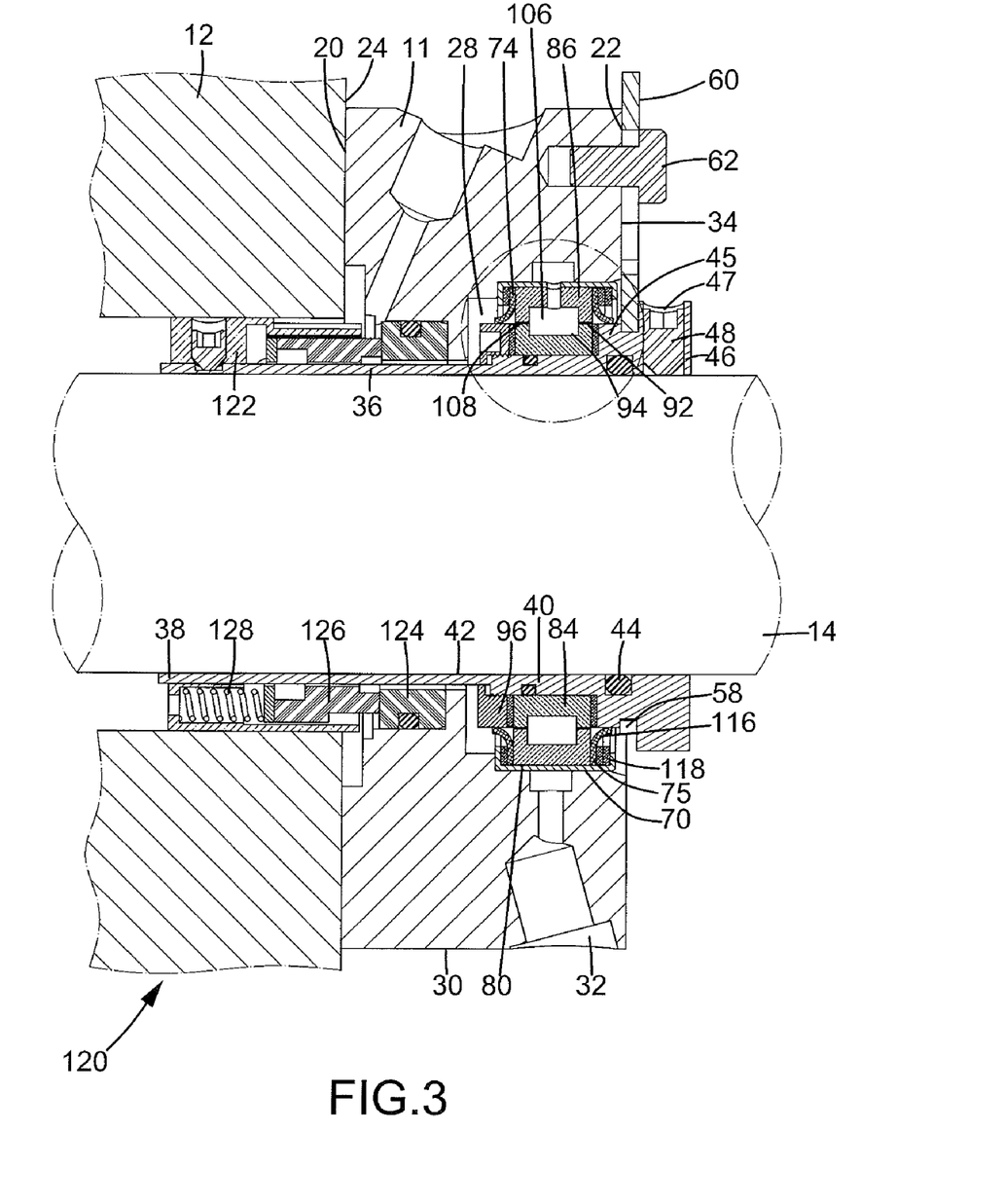
FIG. 3 is a cross-sectional view of the shaft-sealing device and the seal cover according to section line 3-3 of FIG. 2 with the seal cover attached to an end of a pump housing and mounted around a rotary shaft in the pump housing.
Figure 4:
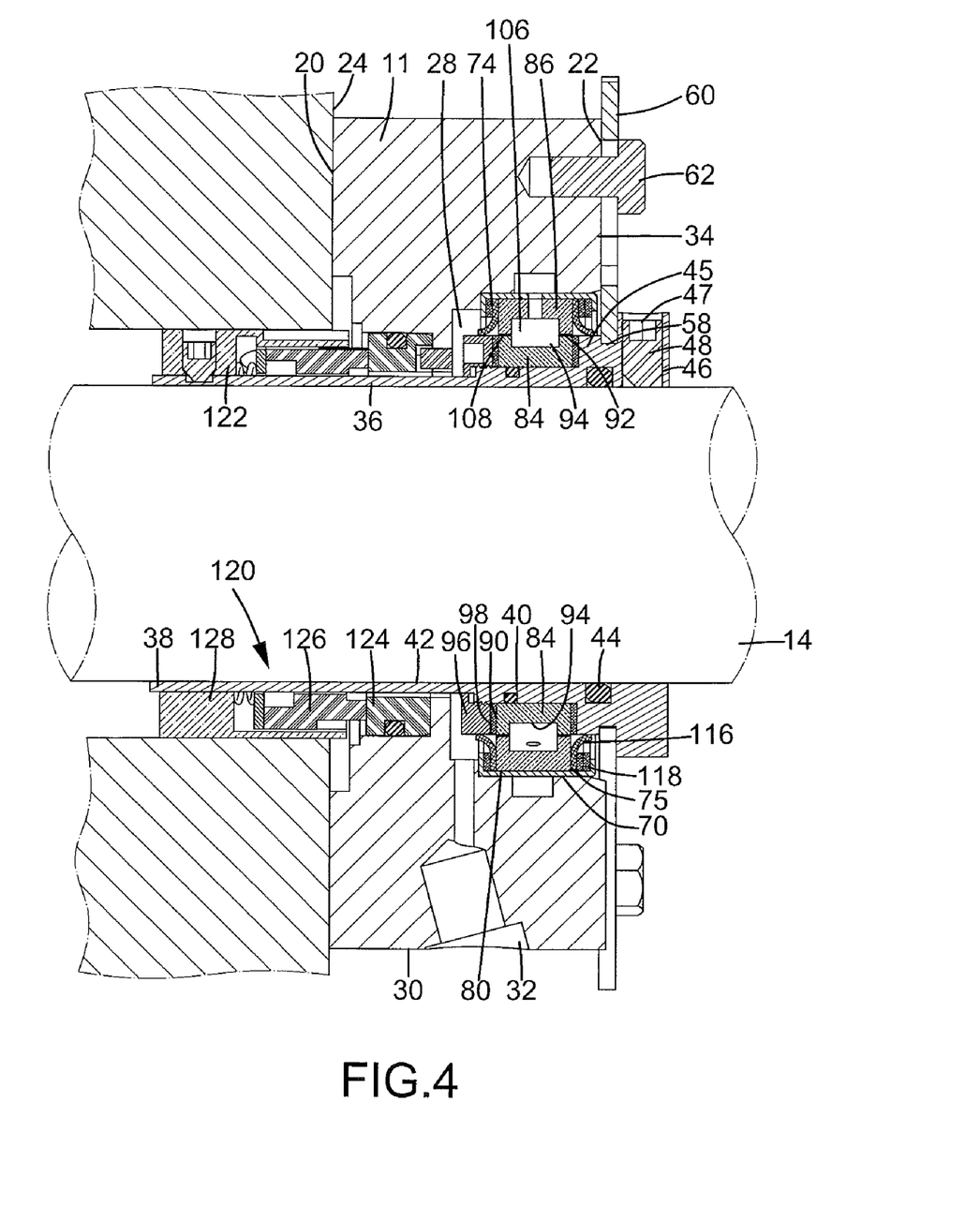
FIG. 4 is a cross-sectional view of the shaft-sealing device and the seal cover according to section line 4-4 of FIG. 2 with the seal cover attached to the pump housing and mounted around the rotary shaft.
Figure 5:
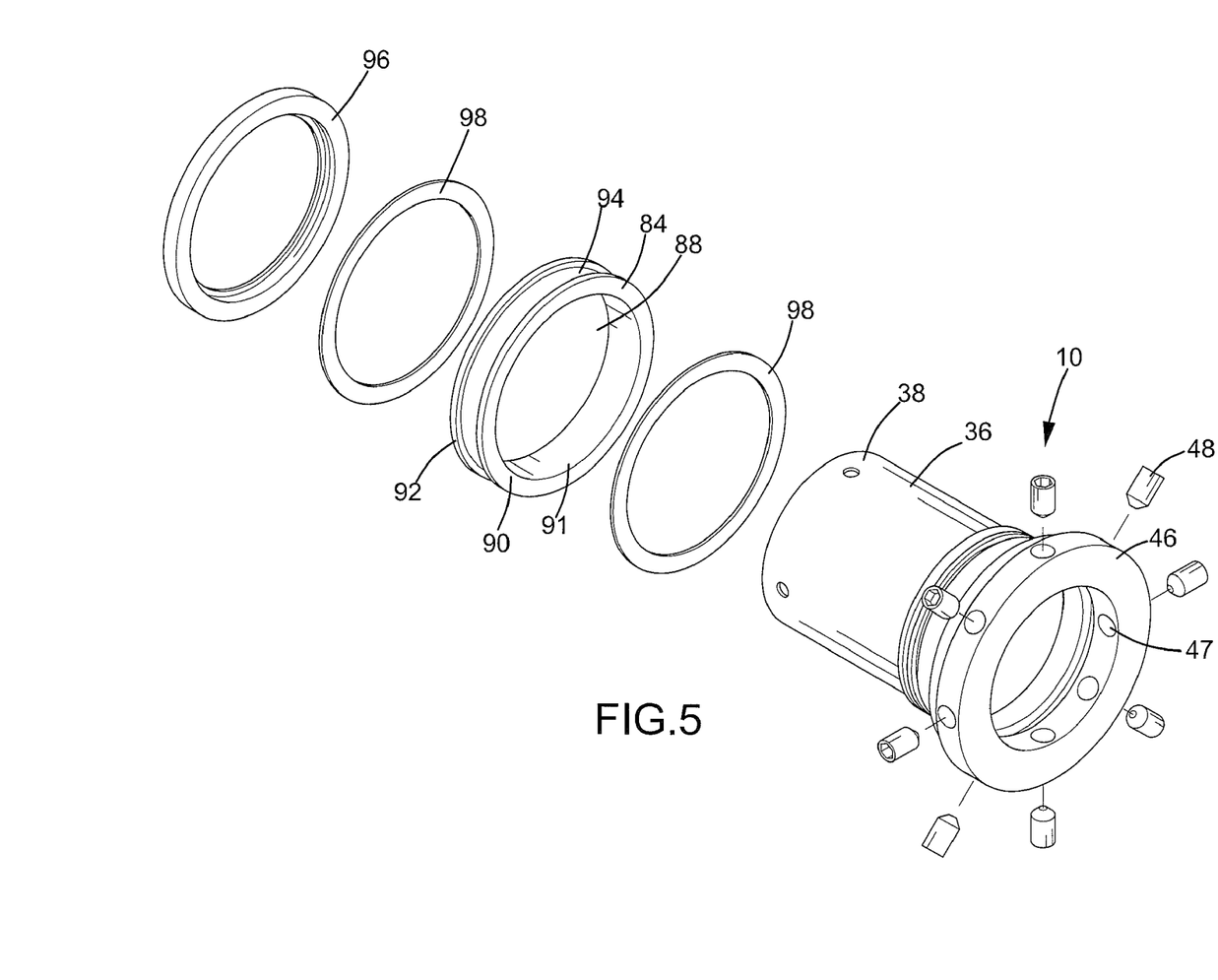
FIG. 5 shows an exploded, perspective view of a shaft sleeve and a portion of a magnetic-field generating unit of the shaft-sealing device of FIG. 1.
Figure 6:
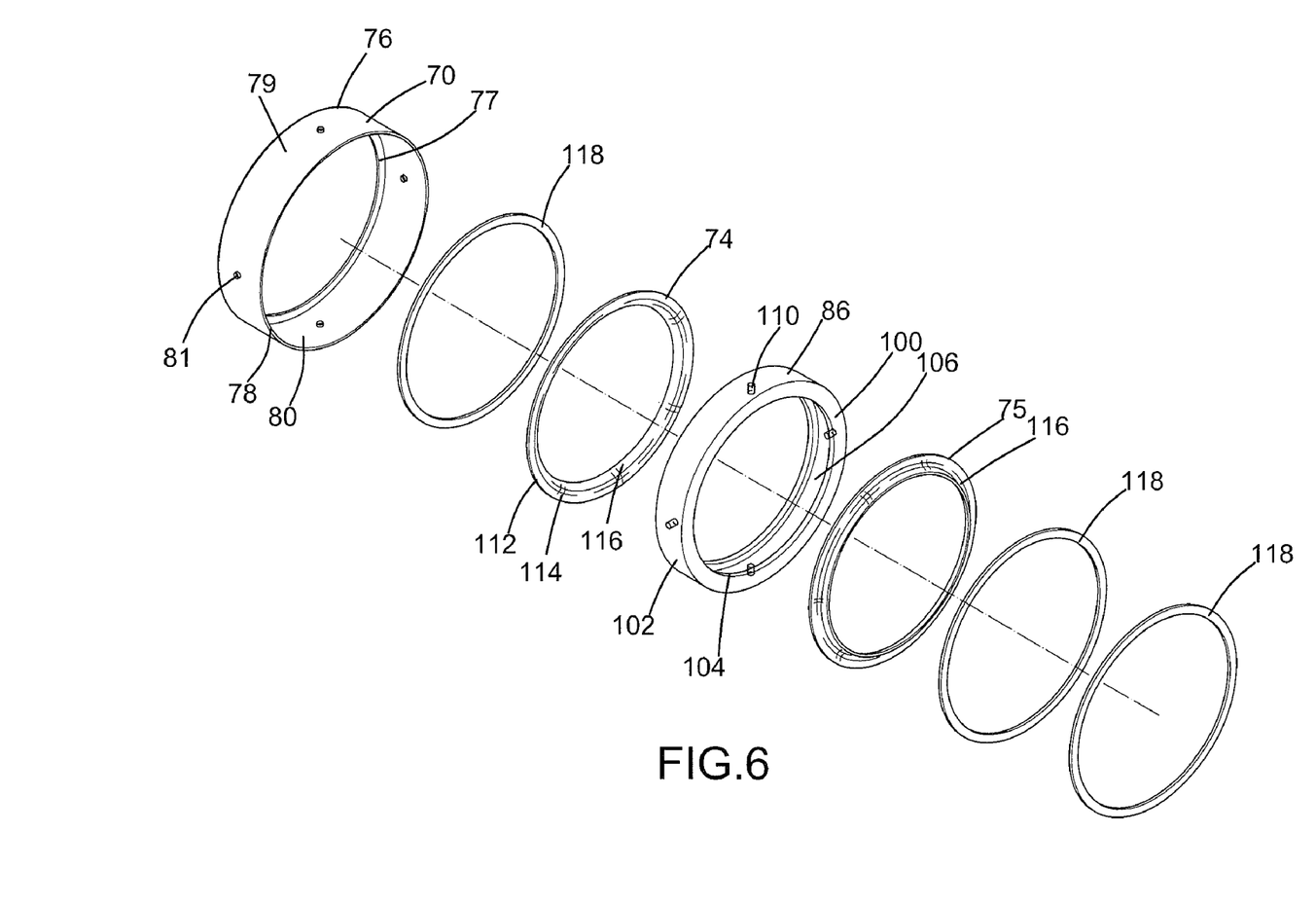
FIG. 6 shows an exploded perspective view of an outer ring and another portion of the magnetic-field generating unit of the shaft-sealing device of FIG. 1.
Figure 7:
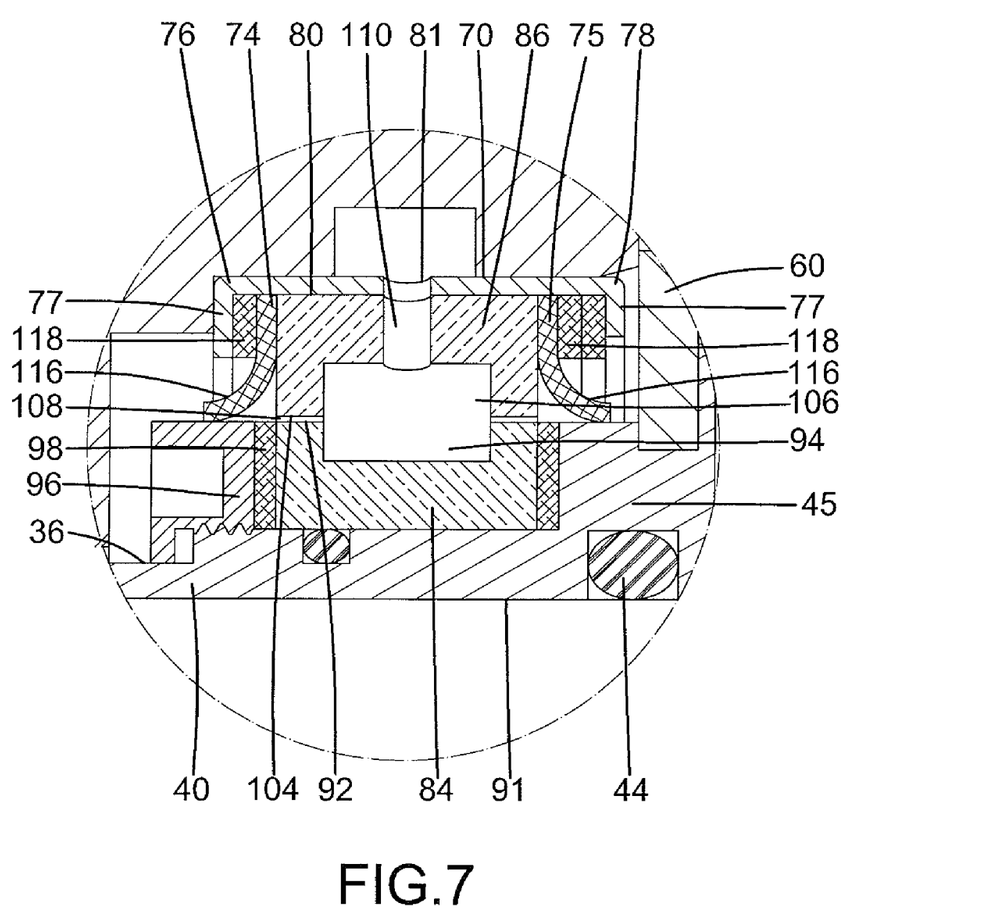
FIG. 7 shows an enlarged view of a circled portion of FIG. 3.
Figure 8:
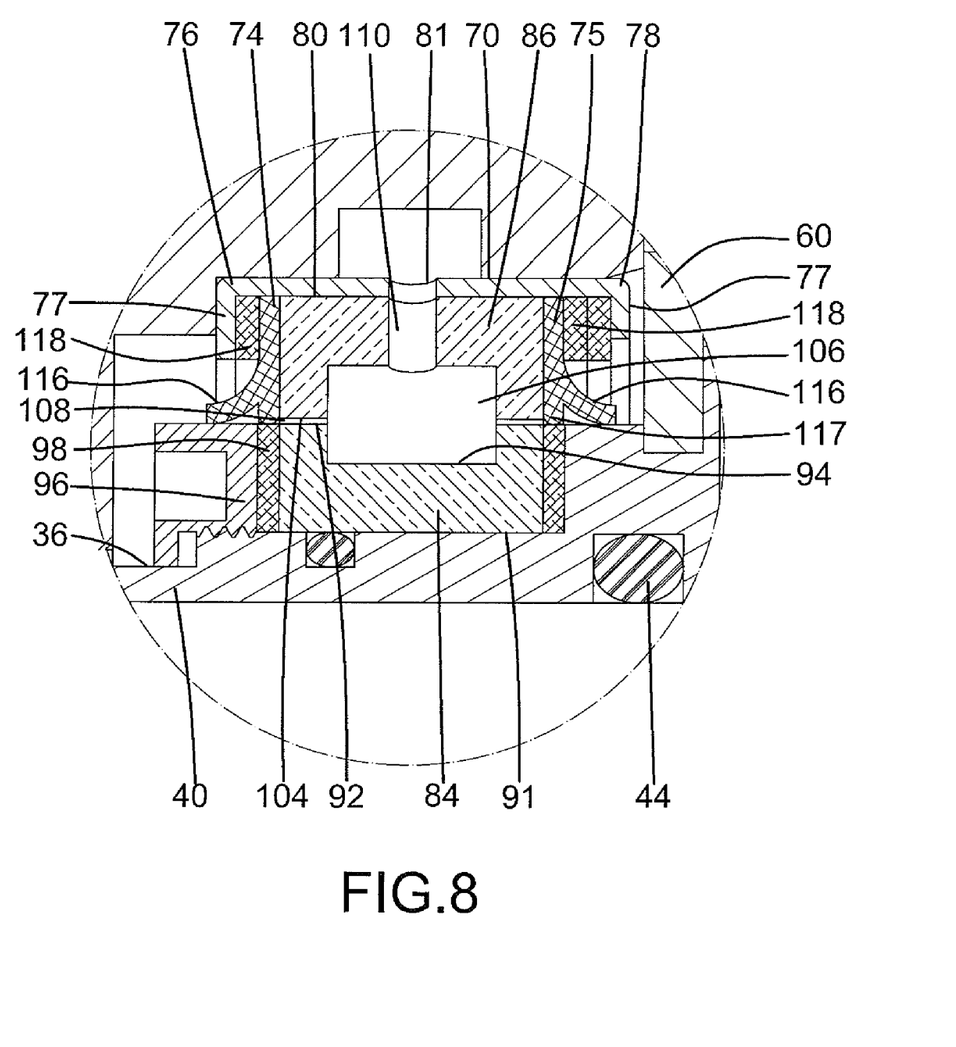
FIG. 8 is an enlarged view similar to FIG. 7, illustrating another example of seal rings of the shaft-sealing device according to the preferred teachings of the present invention.

FIG. 8 shows another example of seal rings 74 and 75 modified from those of the first embodiment. In this embodiment, each seal ring 74, 75 further includes a second lip 117 extending inwards from inner periphery 114 and being at a parallel angle to the radial direction. Second lip 117 of each seal ring 74, 75 includes a distal end extending away from inner periphery 114 of seal ring 74, 75 and abutting gasket 98, preventing the magnetic liquid in magnetic-field generating unit 72 from leaking out of gap 108. Namely, second lip 117 of each seal ring 74, 75 further stops the magnetic liquid in magnetic-field generating unit 72 from escaping from gap 108 during rotation of rotary shaft 14.

Figure 9:
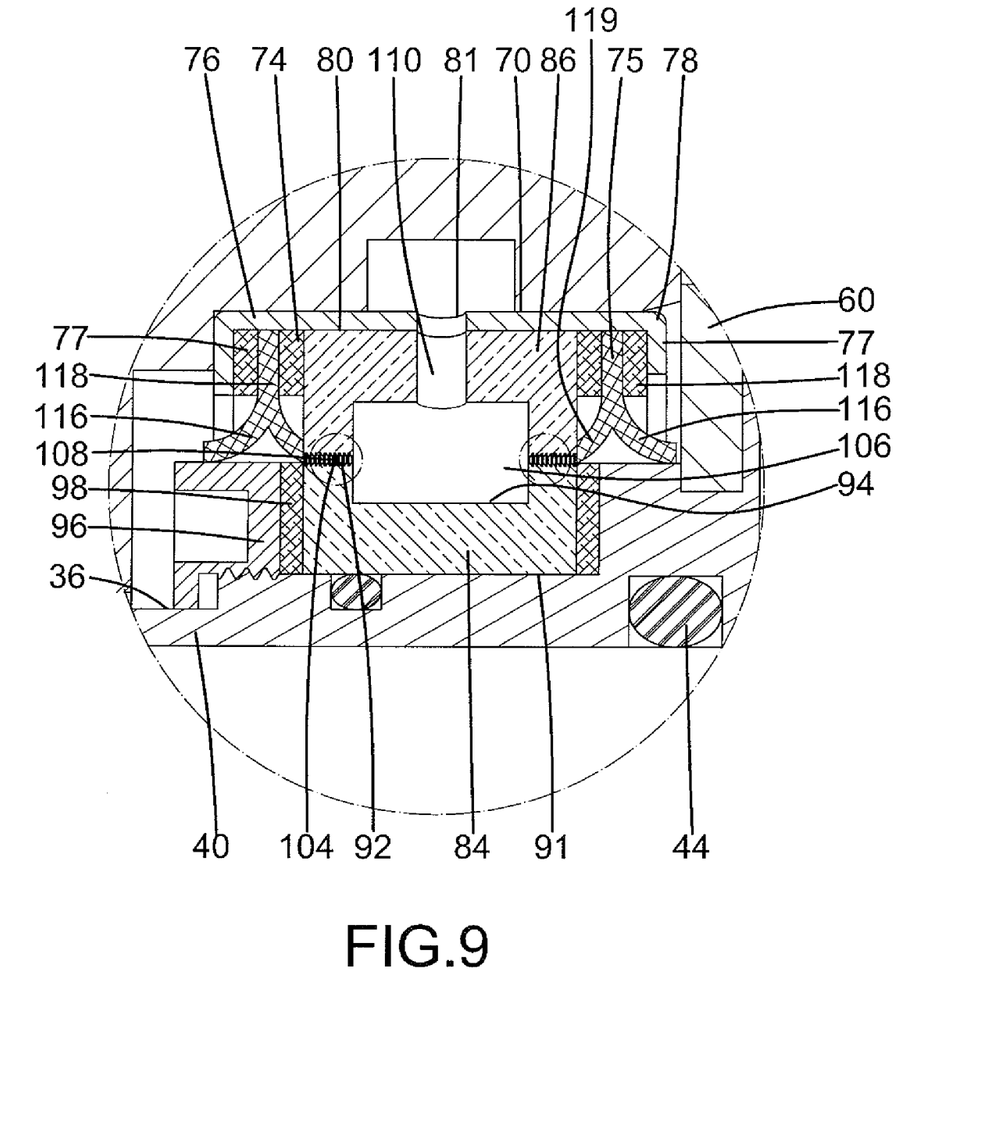
FIG. 9 is an enlarged view similar to FIG. 7, illustrating a further example of seal rings of the shaft-sealing device according to the preferred teachings of the present invention.
Figure 10:
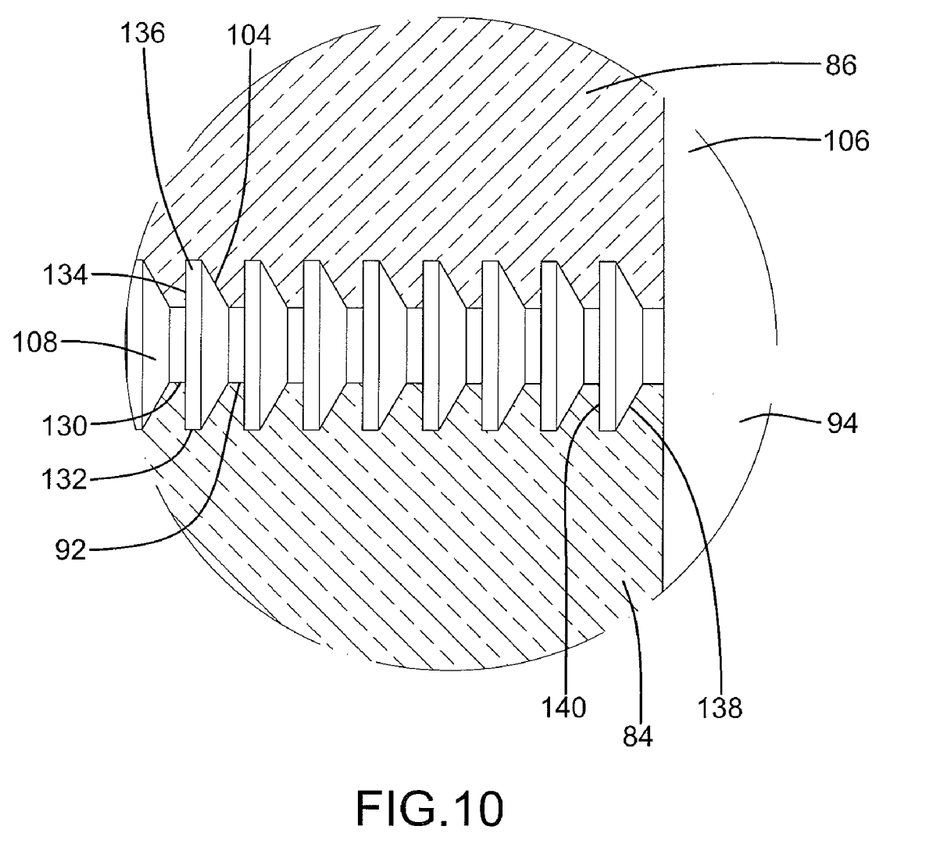
FIG. 10 shows an enlarged view of a left circled portion of FIG. 9.
Figure 11:
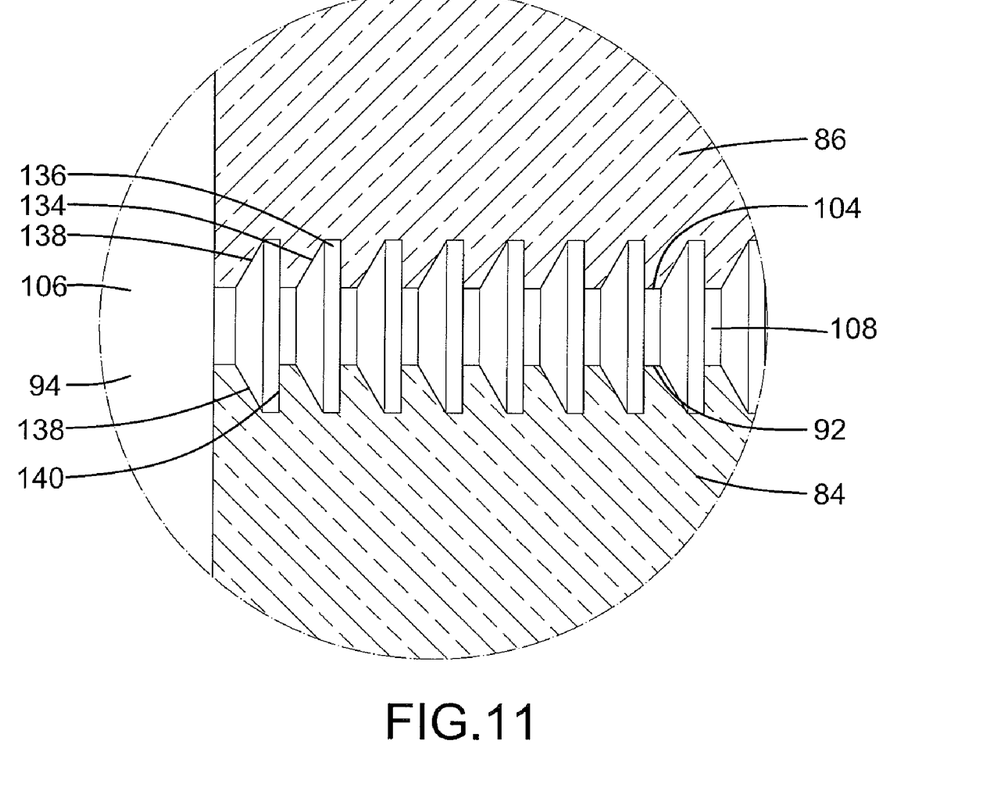
FIG. 11 shows an enlarged view of a right circled portion of FIG. 9.

FIGS. 9-11 show a further example of seal rings 74 and 75 modified from those of the first embodiment. In this embodiment, each seal ring 74, 75 further includes a second lip 119 extending from inner periphery 114 toward outer magnetic ring 86 and at a non-parallel angle to the radial direction. Second lip 119 of each seal ring 74, 75 has arcuate cross sections and includes a distal end (not labeled) extending away from inner periphery 114 of seal ring 74, 75 and abutting gasket 98, preventing the magnetic liquid in outer ring 70 from leaking out of gap 108. Furthermore, inner magnetic ring 84 further includes a plurality of first annular ribs 130 formed on outer periphery 92 and spaced along the axis, and a first groove 132 is formed between two adjacent first annular ribs 130 (see FIG. 10). Outer magnetic ring 86 further includes a plurality of second annular ribs 134 formed on inner periphery 104 and spaced along the axis, and a second groove 136 is formed between two adjacent second annular ribs 134. Each annular rib 130, 134 of inner and outer magnetic rings 84 and 86 can concentrate the magnetic field of outer magnetic ring 86 to increase the density of magnetic fluxes passing across gap 108. Furthermore, each of first and second grooves 132 and 136 has right-angled triangular cross sections and includes a beveled face 138 and a vertical face 140. Beveled face 138 extends toward first and second annular grooves 94 and 106 so that the magnetic liquid in first and second grooves 132 and 136 has a tendency to flow towards first and second annular groove 94 and 106. Further, vertical face 140 of first and second grooves 132 and 136 can prevent the magnetic liquid in first and second annular grooves 94 and 106 from escaping from gap 108 during rotation of rotary shaft 14. Thus, the magnetic liquid can be securely retained in gap 108 to provide an effective seal between pump housing 12 and rotary shaft 14.

It can be appreciated that inner magnetic ring 86 of shaft-sealing device 10 can be a magnet, and the outer magnetic ring 86 is a pole piece. Alternatively, both of inner and outer magnetic rings 84 and 86 can be magnets.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims.

The invention claimed is:
1. A shaft-sealing device comprising, in combination:
a shaft sleeve adapted to receive a rotary shaft to rotate jointly with the rotary shaft;
an outer ring mounted around the shaft sleeve, with the outer ring including first and second ends spaced along an axis, with the outer ring further including inner and outer peripheral surfaces spaced in the radial direction, with the outer ring further including a through-hole extending from the inner peripheral surface through the outer peripheral surface;
a magnetic-field generating unit mounted around the shaft sleeve, with the magnetic-field generating unit including inner and outer magnetic rings spaced in a radial direction perpendicular to the axis, with the inner magnetic ring including inner and outer peripheries spaced in the radial direction, with the inner periphery of the inner magnetic ring mounted around and abutting the shaft sleeve, with the outer magnetic ring mounted in the outer ring and between the outer ring and the inner magnetic ring in the radial direction, with the outer magnetic ring including an inner periphery facing the outer periphery of the inner magnetic ring, with a gap defined between the inner periphery of the outer magnetic ring and the outer periphery of the inner magnetic ring, with the gap adapted to be filled with a magnetic liquid, with the outer magnetic ring further including a hole in communication with the through-hole, with one of the inner and outer magnetic rings being a magnet for creating a magnetic field providing magnetic force to retain the magnetic liquid in the gap, with the magnetic liquid adapted to be filled in the gap through the hole and the through-hole; and a first seal ring mounted in the outer ring and located between the outer magnetic ring and the first end of the outer ring, with the first seal ring including inner and outer peripheries spaced in the radial direction, with the shaft sleeve extending through the first seal ring, with the first seal ring further including a first lip extending from the inner periphery of the first seal ring toward the first end of the outer ring, with the first lip of the first seal ring at a non-parallel angle to the radial direction of the first seal ring to form a first seal around the shaft sleeve.

2. The shaft-sealing device as claimed in claim 1, with the inner magnetic ring further including two ends spaced along the axis, with the inner magnetic ring further including a first annular groove formed in the outer periphery of the inner magnetic ring and between the two ends of the inner magnetic ring.

3. The shaft-sealing device as claimed in claim 2, with the outer magnetic ring further including two ends spaced along the axis, with the outer magnetic ring further including a second annular groove formed in the inner periphery of the outer magnetic ring and between the two ends of the outer magnetic ring, and with the second annular groove of the outer magnetic ring aligned with the first annular groove of the inner magnetic ring.

4. The shaft-sealing device as claimed in claim 3, with the shaft sleeve including a flange formed on an outer periphery thereof, with one of two ends of the inner magnetic ring abutting against the flange, with a positioning ring mounted around the shaft sleeve, with one of two ends of the inner magnetic ring abutting against the positioning ring, and with the inner magnetic ring positioned between the flange and the positioning ring.

5. The shaft-sealing device as claimed in claim 4, with the inner magnetic ring further including two ends spaced along the axis, with the inner magnetic ring further including a first annular groove formed in the outer periphery of the inner magnetic ring and between the two ends of the inner magnetic ring, with the outer magnetic ring further including two ends spaced along the axis, with the outer magnetic ring further including a second annular groove in the inner periphery of the outer magnetic ring and between the two ends of the outer magnetic ring, and with the second annular groove of the outer magnetic ring aligned with the first annular groove of the inner magnetic ring.

6. The shaft-sealing device as claimed in claim 5, with the outer ring further including inner and outer peripheral surfaces spaced in the radial direction, with the outer ring further including a through-hole extending from the inner peripheral surface through the outer peripheral surface, with the outer magnetic ring further including a hole in communication with the through-hole, and with the magnetic liquid adapted to be filled in the gap through the hole and the through-hole.

7. The shaft-sealing device as claimed in claim 5, further comprising, in combination:
a second seal ring mounted in the outer ring and located between the outer magnetic ring and the second end of the outer ring, with the second seal ring including inner and outer peripheries spaced in the radial direction, with the shaft sleeve extending through the second seal ring, with the second seal ring further including a first lip extending from the inner periphery of the second seal ring toward the second end of the outer ring, with the first lip of the second seal ring at a non-parallel angle to the radial direction of the second seal ring to form a second seal around the shaft sleeve.

8. The shaft-sealing device as claimed in claim 2, further comprising, in combination: a second seal ring mounted in the outer ring and located between the outer magnetic ring and the second end of the outer ring, with the second seal ring including inner and outer peripheries spaced in the radial direction, with the shaft sleeve extending through the second seal ring, with the second seal ring further including a first lip extending from the inner periphery of the second seal ring toward the second end of the outer ring and at a non-parallel angle to the radial direction of the second seal ring to form a second seal around the shaft sleeve.

9. The shaft-sealing device as claimed in claim 8, with each of the first and second seal rings further including a second lip extending from the inner periphery of each of the first and second seal rings inwards in the radial direction or in a direction reverse to an extending direction of the first lip.

10. The shaft-sealing device as claimed in claim 3, with the inner magnetic ring further including a plurality of first annular ribs spaced along the axis on the outer periphery thereof, with a first groove formed between two adjacent first annular ribs, with the outer magnetic ring further including a plurality of second annular ribs spaced along the axis on the inner periphery of the outer magnetic ring, with a second groove formed between two adjacent second annular ribs, with each of the first and second grooves having right-angled triangular cross sections and including a beveled face and a vertical face, and with the beveled faces of the first and second grooves extending toward the first and second annular grooves.

\* \* \* \* \*